United States Patent [19]

Franck et al.

[11] Patent Number: 5,573,617
[45] Date of Patent: Nov. 12, 1996

[54] METHOD OF MAKING A TWO-TONE INTERIOR VEHICLE TRIM PANEL SKIN

[75] Inventors: Donald L. Franck, Warren; Thomas L. Richter, Sterling Heights; Manhar K. Sheth, Troy; Thomas C. Mack, Northville, all of Mich.; Ballard Parsons, Jr., Franklin, Ohio

[73] Assignee: General Motors Corporation, Detroit, Mich.

[21] Appl. No.: 421,171

[22] Filed: Apr. 13, 1995

[51] Int. Cl.⁶ .......................... B29C 51/10; B29C 65/02; B29C 65/18; B29C 65/74
[52] U.S. Cl. .................... 156/196; 156/157; 156/159; 156/229; 156/251; 156/267; 156/285; 156/304.1; 156/304.6; 156/308.4; 156/309.6; 156/309.9; 156/502; 156/507; 156/515; 264/511; 428/57
[58] Field of Search ...................... 156/502, 507, 156/515–518, 157, 159, 229, 246, 251, 267, 285, 304.6, 304.7, 309.6, 309.9, 304.1, 494, 308.4, 196; 269/21; 428/57–58; 264/511

[56] References Cited

U.S. PATENT DOCUMENTS

| | | |
|---|---|---|
| 2,859,153 | 11/1958 | Zucht . |
| 2,941,577 | 6/1960 | Roseman . |
| 3,046,179 | 7/1962 | Stallard . |
| 3,390,038 | 6/1968 | Hadley ..................................... 156/159 |
| 4,177,100 | 12/1979 | Pennington . |
| 4,390,384 | 6/1983 | Turner . |
| 4,861,543 | 8/1989 | Rafferty .............................. 264/511 X |
| 4,925,151 | 5/1990 | Gray . |
| 5,033,954 | 7/1991 | Kargarzadeh . |
| 5,225,261 | 7/1993 | Kargarzadeh . |
| 5,232,529 | 8/1993 | Miyake . |
| 5,304,273 | 4/1994 | Kenrick et al. . |
| 5,405,470 | 4/1995 | Held ........................................ 156/159 |
| 5,418,032 | 5/1995 | Martin ...................................... 428/71 |

Primary Examiner—Adrienne C. Johnstone
Attorney, Agent, or Firm—Ernest E. Helms

[57] ABSTRACT

A method for making a two-tone vinyl skin cover for an automotive interior trim panel is provided including heating a first vinyl skin to a working temperature; heating a second vinyl skin to a working temperature; stretching the first vinyl skin over a first male vacuum mold, the first mold having a first welding blade along a translationally separable part line; applying a vacuum via the first mold to the first vinyl skin; stretching the second vinyl skin over a second male vacuum mold, the second male mold having a second welding blade along a translationally separable part line aligned with the translationally separable part line of the first mold; applying a vacuum via the second mold to the second vinyl skin; heating the first and second vinyl skins through the first and second welding blades; and abutting the first and second welding blades together under a pressure force to heat weld the first and second vinyl skins together until such time as the first and second vinyl skins are welded to one another while maintaining the vacuum applied thereto.

3 Claims, 2 Drawing Sheets

METHOD OF MAKING A TWO-TONE INTERIOR VEHICLE TRIM PANEL SKIN

FIELD OF THE INVENTION

The field of the present invention is that of two-tone interior trim panels in automotive vehicles, especially interior trim panels utilized for dashboards and vehicle side door panels.

BACKGROUND OF THE INVENTION

To make the driving experience more pleasurable, there is a continuing effort to enhance the appearance of the interior of the vehicle. Many if not most interior door panels are a three-part composite having a vinyl or cloth skin facing the interior of the vehicle. The skin covers a generally rigid piece of plastic such as a glass-reinforced urethane. For a more premium appearance, typically a padding material will be captured between the vinyl or cloth skin and the more rigid urethane backing. To form the composite panel, the skin will be placed in the lower portion of a mold, the rigid backing will be placed on top of the skin and the foam padding (in a liquid form) will be poured in the mold between the skin and the rigid backing. A chemical reaction of the foam padding material will cure the foam backing, allowing the backing to be "foamed" in place.

Presently the majority of automotive interior door panels in more premium vehicles have a three-dimensional contour which incorporates an arm rest. Therefore, the skin is typically preformed to assume the three-dimensional shape.

In automotive interior trim panels which have a vinyl skin, aesthetic considerations demand the portrait of a leather grain-like appearance. To achieve the grain-like appearance, two methodologies are utilized. In the first technique, a female mold is used to preform the vinyl skin. Therefore, the mold contacts the vinyl skin on a side of the vinyl skin which will be exposed to the vehicle occupant. Therefore, to achieve a grained leather appearance, the mold must be "grained". Graining a mold adds approximately $10,000 to $15,000 to the cost of the mold.

To avoid the cost associated with female molds, a second technique is to use a male mold to preform the vinyl skin. The male mold contacts the vinyl skin on a side of the skin which faces away from the occupant. Therefore, a vinyl skin which has a grained surface prerolled on it from the vinyl skin supplier can be used.

More and more, auto designers seek to have a two-tone effect on interior trim panels. The tones may be distinguished by color and/or texture. One way to achieve the two-tone effect is to simply paint the vinyl skin. Although this seems to be a rather simple solution, it is very difficult since the vinyl skin is a three-dimensional part, and it is virtually impossible to predict where a paint line will end up after the skin has been placed in a mold and the foam backing has been introduced and expanded. Another failure of just painting the skin is that one is limited to differentiations in color only, not in texture of leather grain patterns.

Another technique to provide a two-tone effect is to add an insert to the door panel which is mechanically or adhesively affixed to the door panel over a base vinyl skin. Although the above technique is effective, it requires additional gluing or mechanical fasteners which add to the weight of the vehicle and more importantly to the cost of achieving the two-tone effect.

Another technique to achieve the two-tone effect is to weld two vinyl skins in an overlapping fashion. An example of a sonic welded skin is described in Martin, U.S. Ser. No. 08/161,491 filed Dec. 6, 1993, now U.S. Pat. No. 5,418,032. The welded technique of Martin works well; however, in more premium vehicles, an appearance of a dielectric weld line is thought not to be preferable.

Still another method utilizes a closed metal container with internal female grain surfaces in the configuration of the desired panel shape. Powdered vinyl is loaded into the container, and the entire unit is placed in a high output oven set at from approximately 450° F. to 550° F. The mold is then rotated in all directions, and heat imparted to the mold causes the powder to melt and fuse to the internal surface. This creates a continuous skin of a first color to be formed within the container. A portion of the mold is then masked, and a vinyl of a second color is then added into the mold for a similar process as described for the first color. The mold container is then removed from the oven and cooled to room temperature. The mold is then re-opened and the grain skin is extracted for subsequent molding operation. Although the above-noted technique is fairly effective, it still requires a female grain mold and cycle times and the associated capital expenses are high, thereby causing vinyl skins formed by the rotary mold technique to be relatively quite expensive.

To allow for an interior trim panel with a two-tone appearance with a vinyl skin at a far lower cost than what has been previously available, the present invention is brought forth.

SUMMARY OF THE INVENTION

The present invention presents a process for forming a vinyl skin for an interior trim panel which allows the utilization of separate vinyl textures and also allows the utilization of pre-grained vinyl material by allowing the skin to be formed on a male die. The present inventive process includes heating a first vinyl skin and a second vinyl skin to a working temperature. The first vinyl skin is stretched over a first male vacuum mold which has a welding blade along a translationally separable part line. A vacuum is applied via the first mold to the first vinyl skin. The second vinyl skin is stretched over a second male vacuum mold. The second mold has a weld blade along a translationally separable part line aligned with the translationally separable part line of the first male mold. The vinyl skins are heated through the welding blades and are then abutted together under pressure to heat weld the vinyl skins together.

These and other advantages of the present invention will be brought forth as the invention is further explained in the accompanying drawings and detailed description.

DESCRIPTION OF THE PREFERRED EMBODIMENT

Figure 1:
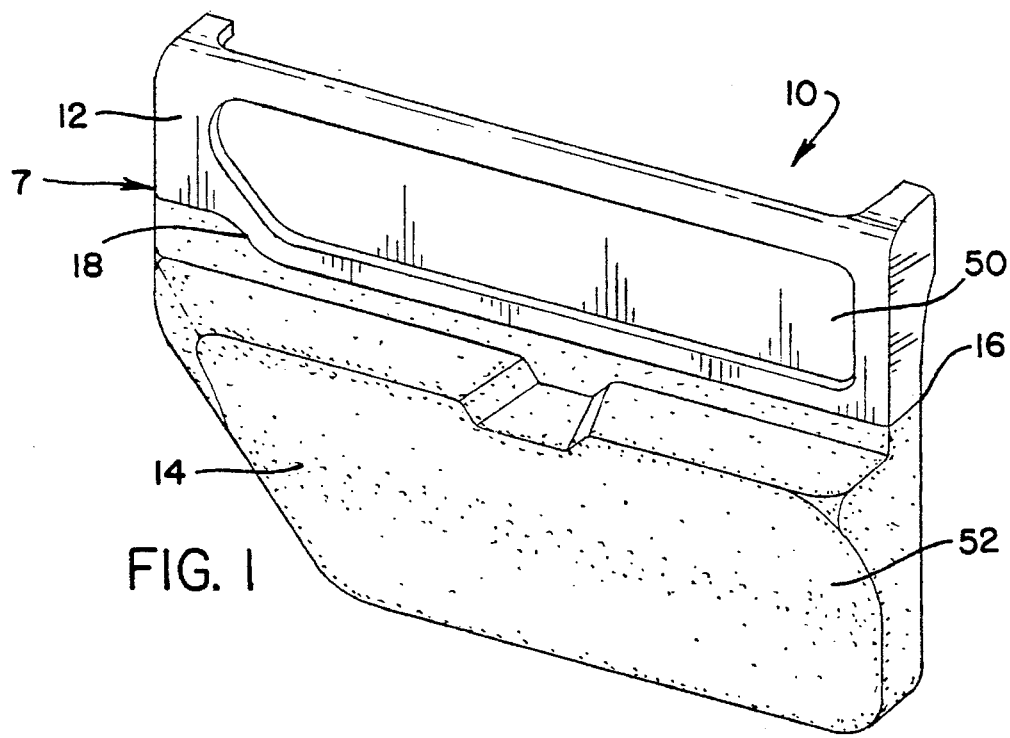
FIG. 1 is a perspective view of a vehicle door panel having a two-tone vinyl skin made with the preferred embodiment process according to the present invention.
Figure 2:
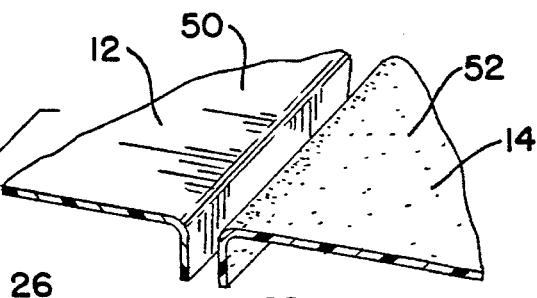
FIG. 2 is a perspective view of the two halves of a male vacuum mold utilized in the process according to the present invention.
Figure 2:
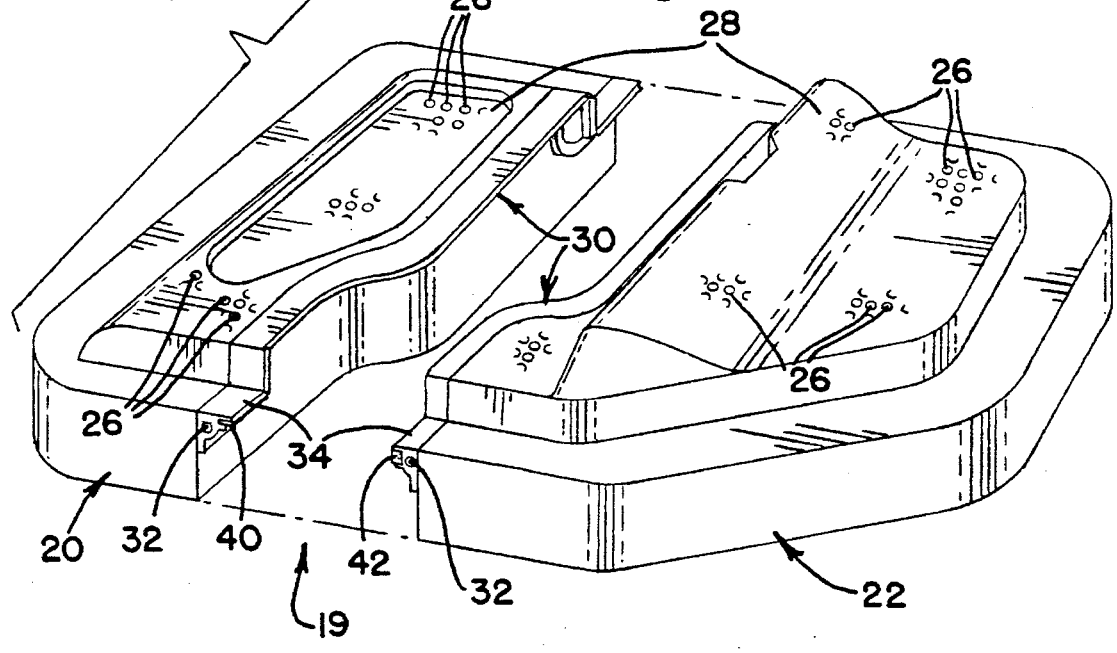
Figure 3A:
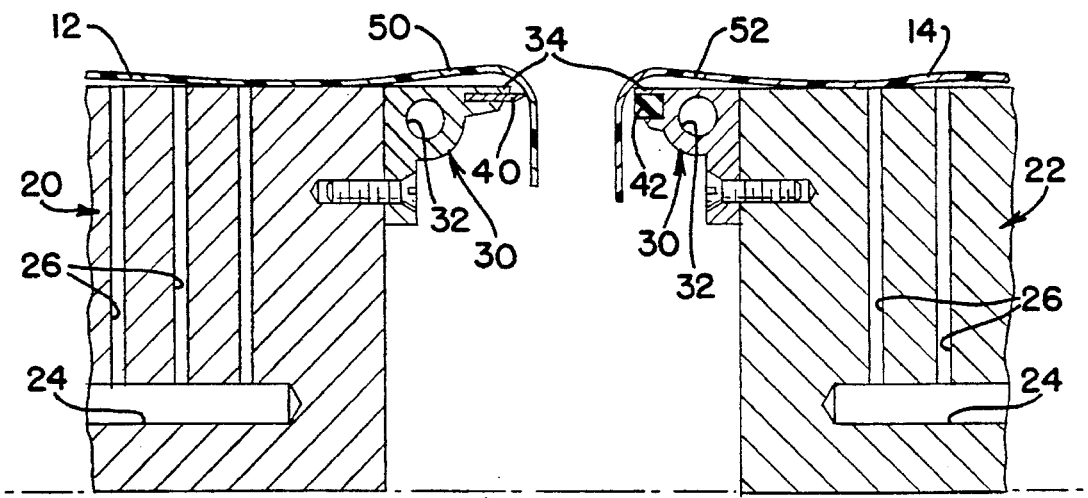
FIGS. 3A, 3B and 3C are enlarged cross-sectional views of the mold illustrated in FIG. 2, showing the operation of the present inventive process.
Figure 3B:
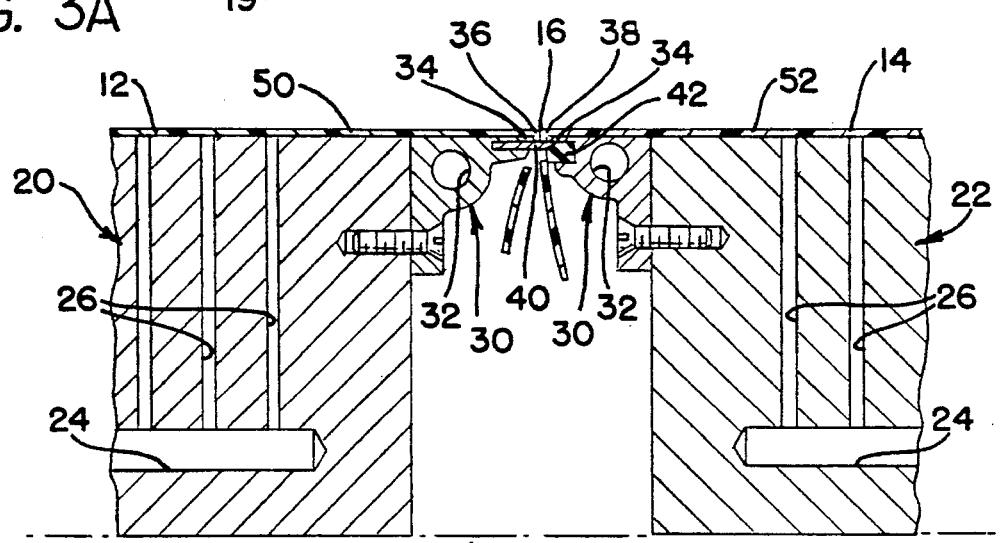
Figure 3C:
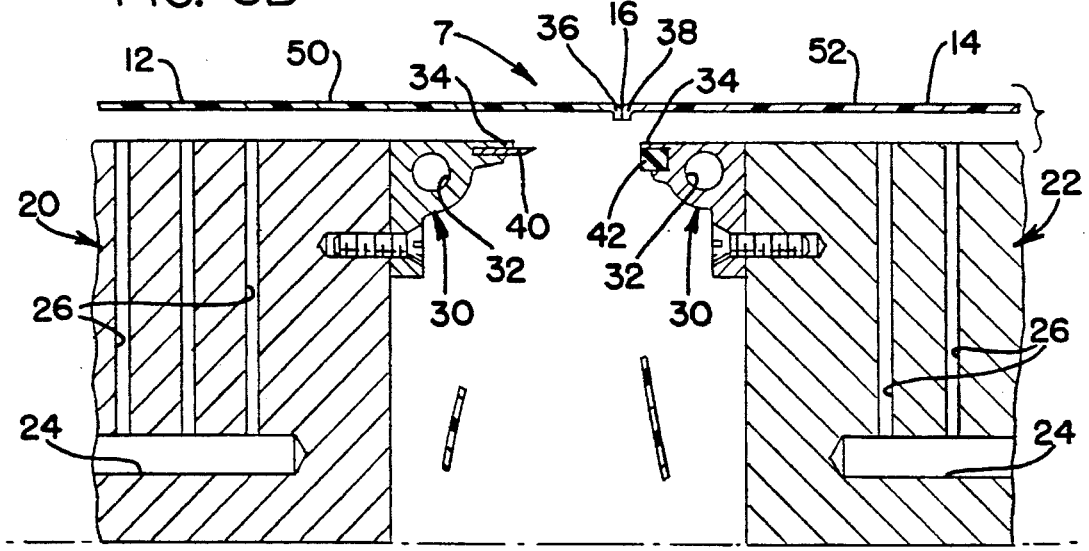

Referring to FIG. 1, a door panel 10 is shown having a two-part vinyl skin 7 made according to the present inventive process. The vinyl skin 7 has a first part 12 and a second part 14 which contrast in texture and/or in color. Between the vinyl skins 12 and 14 there is a part line 16 which is formed in three dimensions having curvilinear portion 18. The vinyl skins will typically be polyvinylchloride (PVC) plastic and may or may not be fabric reinforced. Typically, the vinyl skins will be in the range of 1.5 to 2.0 mm thick.

The vinyl skins will both be heated in an infrared automatic-type oven. The heating process will occur for approximately 50 to 90 seconds, preferably bringing the vinyl at least an optimum working temperature range of 300° F. to 325° F. After the vinyl skins 12 and 14 are sufficiently heated, they will be placed over two halves 20, 22 of a male vacuum-forming mold with grained surfaces 50, 52 facing upward. Placement of the vinyl skins 12 and 14 over the mold 19 with halves 20 and 22 may be by hand placement or an automatic process. Mold halves 20, 22 have a vacuum manifold 24 which is joined to a series of vacuum capillaries 26 with the top surface 28 of the mold. The number and placement of capillaries 26 will be related to the shape of the skin. Mold halves 20 and 22 will typically both be placed on rails, with one half being hydraulically powered to an open or closed welding position.

The mold half 20 along its part line has a heated blade 30 typically made from copper or brass or other suitable material. The blade 30 has an interior cavity 32 for placement of an electric heater coil (not shown). The blade 30 is kept at a temperature of approximately 200° F. to 250° F. The blade 30 has a weld tip 34 approximately 1.5 mm thick but usually no more than 2 mm thick. The mold half 22 has a similar weld blade 30 with a weld tip 34.

As mentioned previously, the vinyl skins 12 and 14 are laid on top of the mold halves 20 and 22. A vacuum is first exposed to the surfaces of the mold, causing the skins 12, 14 to pull tightly to the surface contour of the mold halves 20, 22. The skins lose heat very quickly, experiencing a temperature loss at a rate of approximately 10° F. per second. The mold halves 20 and 22 are then brought together by movement of one or both of the mold halves 20, 22, causing the ends 36 and 38 of the vinyl skins to adhere to each other under pressure of approximately 50 psi while at the same time being heated.

The mold half 20 also has a shearing blade 40 underneath its weld tip 34. Shearing blade 40 is inserted into a fiber fibroflex sheet 42 which has the special property of being able to heal itself from slicing wounds. As the mold halves 20 and 22 are brought together, the portion of the skins 12 and 14 beyond the part line 16 are automatically trimmed.

After a hold time of approximately 60 to 80 seconds, the vacuum will be released and the mold halves 20, 22 will be separated. The skin is sufficiently formed to then be removed from the molds in preparation for the application of the next vinyl skins 12, 14. Therefore, the sequential steps of vacuum forming, fuse welding and offal removal are simultaneously performed on a single machine with a very short cycle time.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. A method for making a two-tone vinyl skin cover for an automotive interior trim panel comprising:

heating a first member vinyl skin to a working temperature;

heating a second member vinyl skin to a working temperature;

stretching the first vinyl skin over a first male vacuum mold, the first mold having a first welding blade along a translationally separable part line;

applying a vacuum via the first mold to the first vinyl skin;

stretching the second vinyl skin over a second male vacuum mold, the second male mold having a second welding blade along a translationally separable part line aligned with the translationally separable part line of the first mold;

applying a vacuum via the second mold to the second vinyl skin;

heating the first and second vinyl skins through the first and second welding blades; and abutting the first and second welding blades together under a pressure force to heat weld the first and second vinyl skins together until such time as the first and second vinyl skins are welded to one another while maintaining the vacuum applied thereto.

2. A method as described in claim 1 wherein additionally the first and second vinyl skins are simultaneously trimmed by a cutting blade attached to one of the molds which connects with a target placed on the other mold.

3. A method as described in claim 1 wherein the working temperature to which the first and second vinyl skins are heated is at least 300° F.

\* \* \* \* \*